United States Patent [19]  [11] 4,275,912
Bayer  [45] Jun. 30, 1981

[54] MULTISECTIONED CELLULAR ENERGY-ABSORBING UNIT AND MOUNTING THEREFOR

[75] Inventor: Dean M. Bayer, Anderson, Ind.

[73] Assignee: General Motors Corporation, Detroit, Mich.

[21] Appl. No.: 99,852

[22] Filed: Dec. 3, 1979

[51] Int. Cl.³ .............................................. B60R 19/08
[52] U.S. Cl. ..................................... 293/120; 293/136
[58] Field of Search ............... 293/120, 110, 139, 136, 293/1; 267/140

[56] References Cited

U.S. PATENT DOCUMENTS 3,721,433  3/1973  Sobel .................................. 267/140
4,022,505  5/1977  Saczawa ............................. 293/120

Primary Examiner—Robert R. Song
Attorney, Agent, or Firm—Charles R. White

[57] ABSTRACT

Cellular energy-absorbing unit for vehicle bumpers formed with a plurality of sections interconnected by live hinges to permit the relative displacement of the sections to facilitate attachment of the unit to its support.

2 Claims, 4 Drawing Figures

MULTISECTIONED CELLULAR ENERGY-ABSORBING UNIT AND MOUNTING THEREFOR

This invention relates to impace energy-absorbing bumpers for vehicles and, more particularly, to a new and improved multicelled, resilient energy-absorbing unit having a plurality of adjacent sections interconnected by live hinges to facilitate their relative displacement and their subsequent attachment to a support.

Prior to the present invention, various resilient cellular energy-absorbing units have been devised to provide "soft face" bumpers for vehicles for dissipation of impact loads applied thereto. Such cellular energy-absorbing units are often secured by fastener devices to a backing or rigid support beam attached to the vehicle frame. Prior to the present invention, difficulties have been encountered in securing such cellular energy-absorbing units to the support beam since manufacturing variations occurring in high volume production often resulted in the misalignment of the fastener provision between the energy-absorbing unit and the support beam. For example, if the cellular energy-absorbing unit was molded with fastener tabs or openings which were designed to match with associated openings formed in the support beam, manufacturing tolerances occurring in these separate components could result in the misalignment of the fastener tabs or openings in the energy-absorbing unit with those of the support beam. When such misalignment occurred, the energy-absorbing unit had to be "cold flowed" by tension or compression loading to force fit or align the attachment provision of the two elements. This matching was often difficult and frequently the energy-absorbing unit could not be manipulated sufficiently to make the required match. When this occurred, additional holes had to be provided in the components to accommodate appropriate fastener provision.

This invention eliminates such installation problems, particularly in open-celled energy units through the use of live hinge interconnections between predetermined sections of a one-piece unit. The deflection of the live hinge permits adjacent sections to be easily displaced with respect to one another without "cold flowing" of the materials forming the cells of the unit. After the sections have been laterally displaced and aligned with the fastener openings, the energy-absorbing unit can be readily secured to the support beam without substantial difficulty. Preferably, in this invention, the live hinge extends outwardly from an end wall of a first section to form a wall of a first row of cells of an adjacent section. One of these sections can be fastened in place on the support beam to serve as a base section from which other sections can be easily shifted for appropriate alignment on the beam for subsequent attachment thereto.

A feature, object and advantage of this invention is to provide a new and improved energy-absorbing cellular unit which has a plurality of sections interconnected to one another by live hinge construction that can be readily deflected to permit the lateral displacement of the sections with respect to one another for the alignment of fastener provision between the energy-absorbing unit and a support beam to facilitate attachment of these two components.

Another feature, object and advantage of this invention is to provide a new and improved vehicle bumper construction comprising a multisectioned, energy-absorbing unit which incorporates the interconnection of adjacent sections to one another by resilient live hinges which allow the lateral shifting of the sections with respect to one another through the flexing of the live hinge without "cold flowing" of the material of the unit to failitate attachment of the unit to a support.

These and other features, objects and advantages of this invention will become more apparent from the following detailed description and drawings in which.

Figure 1:
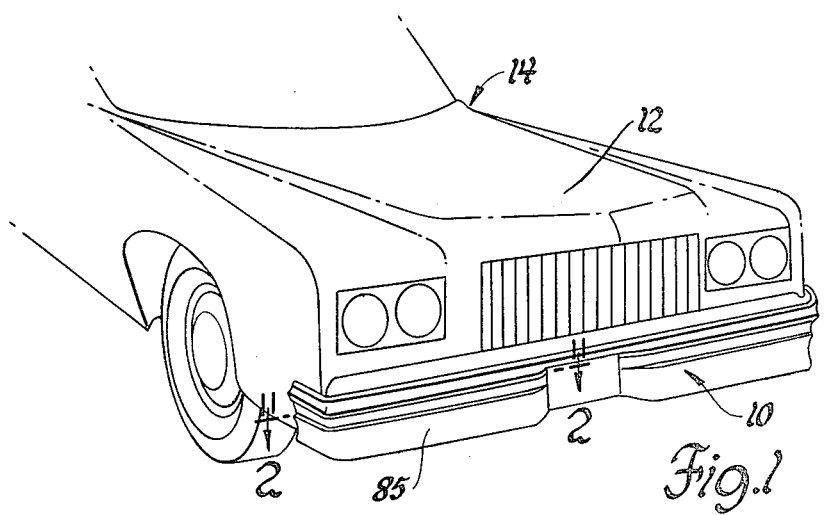
FIG. 1 is a perspective view of a front portion of a vehicle incorporating this invention.

Turning now in greater detail to the drawing, there is shown in FIG. 1 an energy-absorbing bumper assembly 10 that extends horizontally across the front of body 12 of a vehicle 14. Bumper assembly 10 comprises an elongated support beam 16 which may be secured to the side rails of the vehicle frame not shown. Mounted on this support beam is a multisectioned energy-absorbing unit 20, preferably injection molded from an olefin copolymer material. This resilient energy-absorbing unit comprises a plurality of sections 22, 24, 26 and 28. Each section incorporates a latticework of intersecting horizontal and vertical walls, such as walls 32 and 34 of section 22 which form a plurality of longitudinally extending rectangular cells 36. The walls forming the cells are adapted to buckle along their lengths when impacted by loads to dissipate impact energy. After impact the cells gradually recover to their pre-impact conformation.

Figure 2:
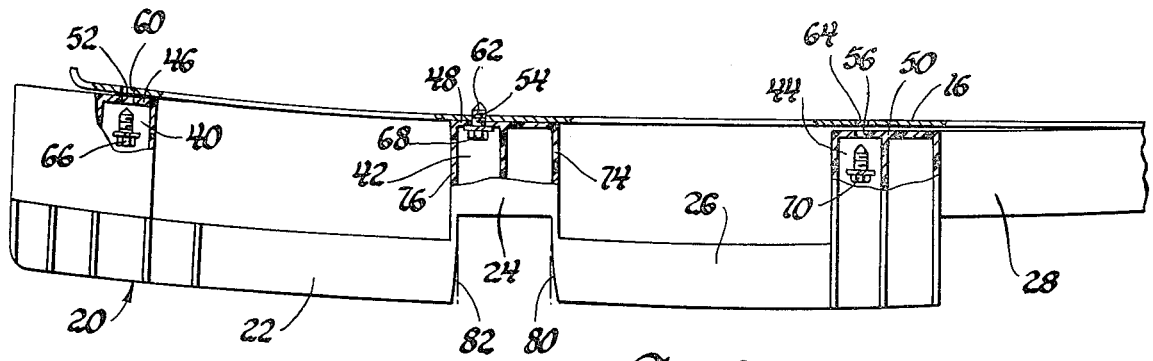
FIG. 2 is a sectional view taken along the lines 2—2 of FIG. 1 as viewed in the direction of the indicator arrows.
Figure 3:
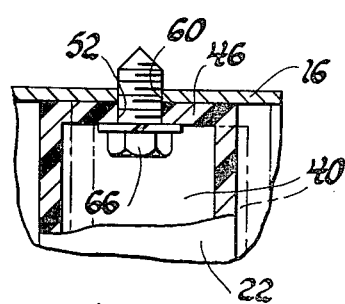
FIG. 3 is an enlarged view of a portion of FIG. 2.
Figure 4:
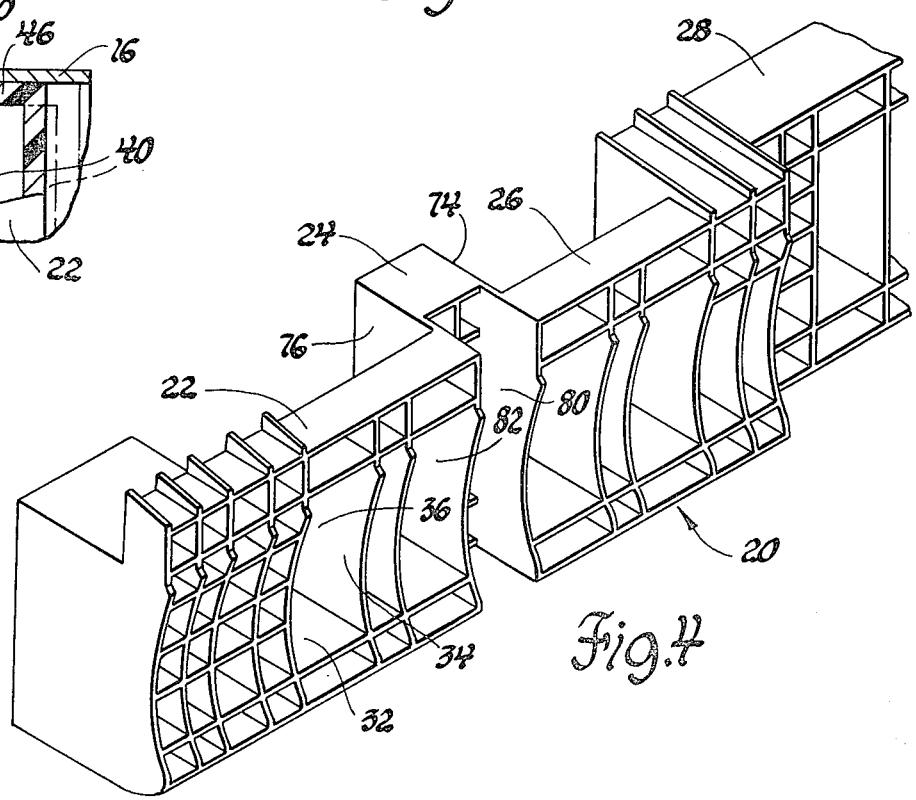
FIG. 4 is a perspective view of a portion of a multisectioned energy-absorbing cellular unit illustraive of this invention.

While most of the cells have open front and rear ends, providing a savings in material and weight, certain others are molded with bottom walls. As shown in FIG. 2, for example, cell 40 of section 22, cell 42 of section 24, and cell 44 of section 26 are formed with bottom walls 46, 48 and 50, respectively. These bottom walls have centralized annular openings 52, 54, and 56 formed therein which are preferably aligned with corresponding openings 60, 62, and 64 drilled or otherwise formed in the support beam 16. These centralized openings accommodate suitable fasteners, such as screws 66, 68, and 70, which are threaded therein after the energy-absorbing unit 20 has been positioned against the support beam 16 with the fastener openings of the energy-absorbing unit and the beam in alignment.

In view of manufacturing variations occurring in the support beam and the energy-absorbing unit, fastener opening alignment does not occur in all cases. However, "cold flowing" as by stretching or otherwise manipulating the sections for proper alignment, is not needed with this inventon in view of the adjustment provision of this invention. To this end, the section 24 of the energy-absorbing unit 20 is molded with sidewalls 74 and 76, having forward extensions 80 and 82, respectively that extend from the outer face of section 24 to provide a pair of live hinges which interconnect adjacent sections. With sections 22 and 26 laterally extending in opposite directions from one another and respectively having their inner sidewalls formed by the extensions 80 and 82 of sections 24, live hinge construction is provided to permit the lateral displacement of one section relative to the other.

As shown in FIG. 2 and assuming that the openings of the energy-absorbing unit and the support beam do not align, the screw 68 can be employed to secure the central section 24 to the bumper beam after alignment of the openings 54 and 62 of the energy-absorber and the beam. After alignment, the screw 68 is installed. Once this has been accomplished, section 22 can be manually pulled to the left deflecting live hinge 82 as viewed in FIG. 2 so that the openings 52 and 60 align to facilitate the insertion of the screw 66 into the aligned openings 52 and 60 for the subsequent securing of section 22 to the bumper beam. Subsequently, section 26 can be moved laterally to the right by the deflection of the live hinge or wall 80 to facilitate the alignment of openings 56 and 64 in the energy-absorbing unit and the support beam 16, respectively to facilitate insertion of the screw 70. This can be accomplished all along the extent of the bumper with lateral displacement of the sections being made with the appropriate deflection of the live hinge interconnection. After the energy-absorbing unit has been completely fastened to the bumper beam, a thin walled facia 85 can be installed over the cellular energy-absorber to provide a finished appearance to the vehicle.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A vehicle bumper comprising a resilient energy absorbing unit, a support having a surface for backing and supporting said unit, said unit comprising a plurality of sections disposed adjacent to each other, each of said sections having a latticework of intersecting walls of plastic material providing plurality of elongated cells extending between inner and outer ends thereof, said support and a first of said sections having first and second separate attachment means cooperatively interfitting to secure said first of said sections to said support, said support and a second of said sections having third and fourth separate attachment means for securing said second of said sections to said support, live hinge means operatively interconnecting said first and second sections of said unit to permit said sections to be laterally moved with respect to one another to permit the alignment of said third and fourth attachment means for cooperatively interfitting with one another to thereby facilitate the attachment of said second section to said support and the securing of said energy absorbing unit to said support.

2. A vehicle bumper comprising a resilient energy absorbing unit, a rigid support having a surface for backing and supporting said unit, said unit comprising first and second sections disposed adjacent to each other, each of said sections having a latticework of intersecting walls of plastic material providing plurality of elongated cells extending between inner and outer ends thereof, a first threaded fastener of said support and said first section having openings adapted to be aligned with one another for receiving fastener so that said first section can be secured to said support, a second threaded fastener, said support and said second section having openings adapted to be aligned for receiving said second fastener so that said second section can be secured to said support, live hinge means integral with and operatively interconnecting said first and second sections and yieldable to permit said sections to be displaced with respect to one another to permit the alignment of said openings in said second section and said support beam to receive said second threaded fastener to thereby facilitate the attachment of said second section of said energy-absorbing unit to said support.

* * * * *